United States Patent [19]

Bose

[11] Patent Number: 4,780,699
[45] Date of Patent: Oct. 25, 1988

[54] INPUT/OUTPUT TERMINAL ASSEMBLY FOR FLEXURE-TYPE PRESSURE TRANSDUCERS

[75] Inventor: A. Eric Bose, Encino, Calif.

[73] Assignee: Solartron Electronics, Inc., Oxnard, Calif.

[21] Appl. No.: 11,569

[22] Filed: Feb. 6, 1987

[51] Int. Cl.$^4$ ............................................. H01C 10/10
[52] U.S. Cl. ......................................... 338/42; 338/36
[58] Field of Search ................................. 338/42, 2–5; 73/726, 708, 721, 727

[56] References Cited

U.S. PATENT DOCUMENTS 4,129,042  12/1978  Rosvold .................................. 73/727
4,462,018  7/1984  Yang et al. ......................... 338/42 X Primary Examiner—E. A. Goldberg
Assistant Examiner—Lateef
Attorney, Agent, or Firm—Sanford J. Asman; Ken Olsen

[57] ABSTRACT

An innput/output terminal assembly for pressure transducers of the flexure type. The transducer includes a flexure member which senses an applied pressure by means of strain gauges mounted thereon. A known problem with such an arrangement concerns the electrical connections to the strain gauges wherein there is conflict between the flexible connections required to accommodate flexure displacement and the rigid connections required to lead away from the gauges since a pressure chamber must be spanned. Previously this conflict has been resolved by bonding an insulative terminal plate proximate the flexure to provide a junction between flexible and rigid conductors. Such an arrangement gives rise to problems of construction rigidity and performance if excess bonding resin contacts the flexure. The invention provides a welded terminal plate, which is insulative by virtue of a thick film layer of glass, on which electrical connection may be made to areas of thick film gold.

13 Claims, 5 Drawing Sheets

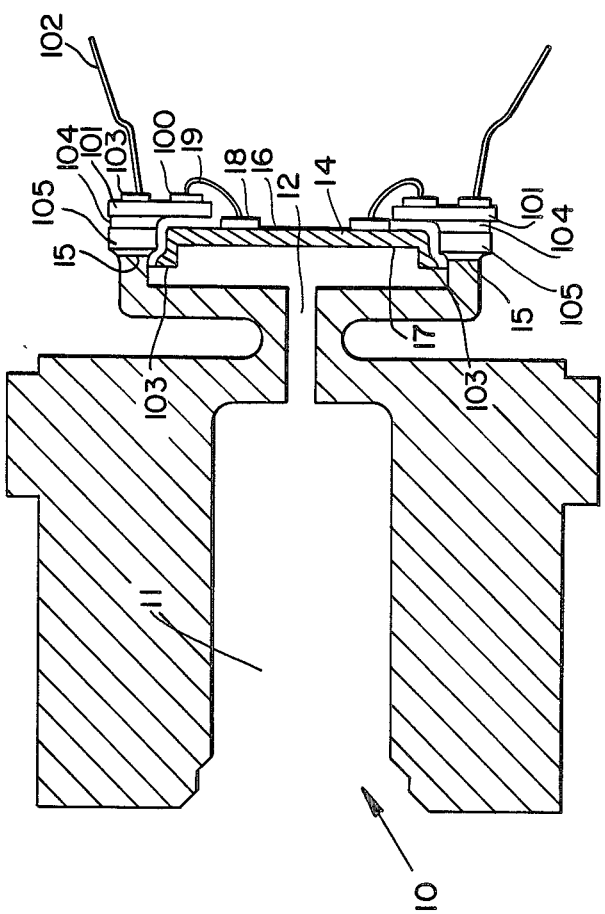

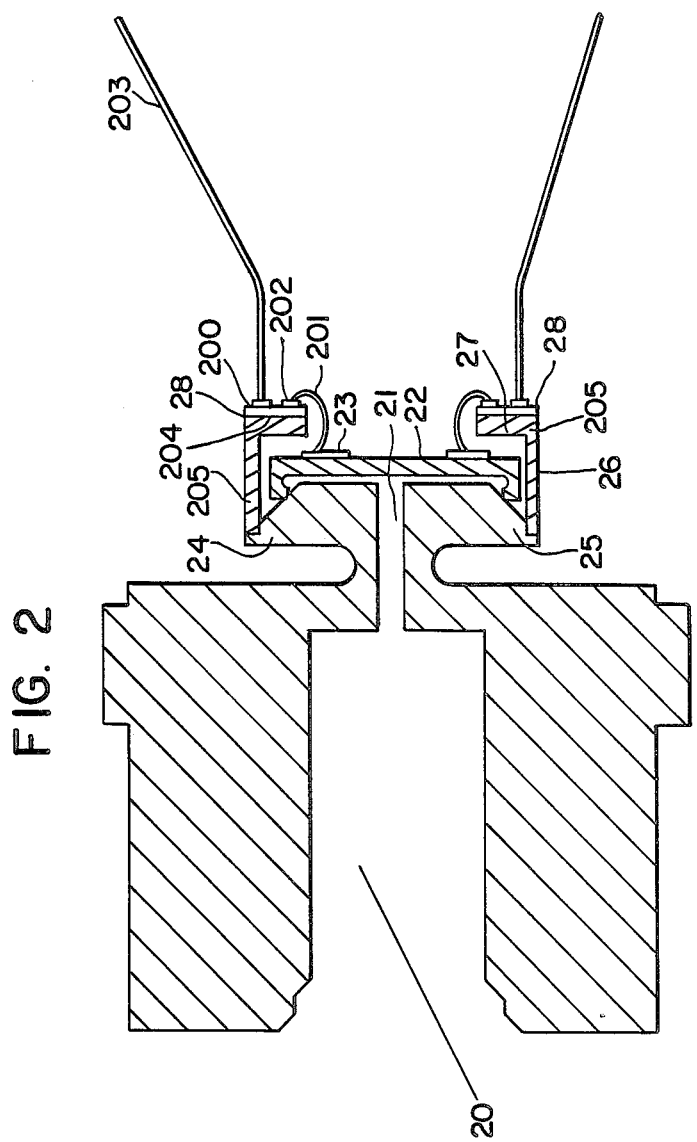

INPUT/OUTPUT TERMINAL ASSEMBLY FOR FLEXURE-TYPE PRESSURE TRANSDUCERS

TECHNICAL FIELD

This invention relates to pressure transducers, and in particular to pressure transducers of the flexure type wherein flexure of a member or part of a member, for example a diaphragm flexure subjected to a pressure difference, is sensed, for example by strain gauges, to give an output signal representative of pressure.

BACKGROUND ART

In conventional pressure transducers of the flexure type, a pressure difference is applied by introducing fluid, gas or other pressure media at a pressure to be measured via a port capped by the flexure and maintaining a known pressure, for example a vacuum, to the other side of the flexure. Typically, strain gauges are placed on the reference side of the flexure. This structure results in two pressure chambers on each side of the flexure, one of which being the reference chamber and the other being exposed to the pressure to be measured. In order to provide a useful gauge, strain gauge connections must be brought through the reference chamber.

The provision of leads connecting the strain gauges and penetrating the reference chamber casing presents a considerable problem in the construction of a pressure sensor of the flexure type. In order to counter the effects of shock and vibration, to which transducers of this type are often subjected, stiff wire is desirable. However this requirement is in conflict with the fundamental operation of the sensor which is based upon movement of the flexure member upon which the strain gauges are mounted. The stiff wires mechanically "load" or dampen the response of the flexure member to pressure changes. A known solution to this problem is to provide a terminal carrying member proximate the strain gauges, bearing terminal pads to which connection may be made with comparatively flexible wire, for example gold wire, and other terminal pads to which connection may be made with comparatively rigid wire, for example nickel, to conduct the connection out through the reference chamber casing.

Pressure transducers of the flexure type are typically formed of metallic components, for example stainless steel, welded together for ruggedness. The provision of terminal pads for such transducers presents a considerable problem since they must be both proximate the flexure and individually electrically isolated from the metallic parts. One solution to this problem is to provide terminal pads upon an insulating substrate, such as a glass-fiber/epoxy board, formed as an annulus and mounted co-axially with the flexure so that the more flexible connections may be led from the flexure through the center of the substrate and the more rigid connections away from its periphery.

In such a design of a flexure type pressure transducer the problem of fixing the substrate proximate the flexure is encountered. Because of the nature of the materials involved the preferred fixing method of welding is of course unavailable. One fixing method in common usage is that of adhesive bonding. Unfortunately the bonding of a component in the region of a flexure, for example with epoxy resin, has the attendant dangers of excess resin contacting the flexure and disrupting its performance. This is in addition to other disadvantages of bonding components including difficulty and expense of assembly, uncertainty as to adhesion quality and poor mechanical strength.

DISCLOSURE OF INVENTION

According to the present invention a pressure transducer comprises a flexure, sensitive to pressure difference between first and second sides thereof, a pressure inlet port, the port being formed as a chamber, the chamber having a chamber extension leading to a flanged mouth portion, the flexure being sealingly attached to the flanged part adjacent the mouth portion such that the chamber is closed by the first face of the flexure and further comprising at least one strain gauge attached to the second face of the flexure member arranged such that displacement of the flexure due to the pressure difference may be sensed electrically, and a terminal plate attached to the flanged portion and extending to provide a surface proximate the flexure, the plate being formed of a material weldable with the flanged portion and the surface having applied thereto a thick film insulative layer, such as vitrified glass, upon which there is at least one area of a thick film conductive material, such as gold, deposited to provide at least one terminal for connection from the strain gauge, e.g. by means of a flexible conductive wire.

It will be appreciated that the invention provides a pressure transducer of the flexure type having a welded terminal plate, which is insulative by virtue of a thick film insulative layer, e.g. glass, on which electrical connection may be made to areas of thick film conductive material, e.g. gold. The welded terminal plate may provide mounting means for a stop extending to limit displacement of the flexure. Advantageously, the stop may be formed as a part of a threaded screw, the terminal plate being adapted to receive the screw by means of a complementary thread thereon, such that the stop position may be adjusted by virtue of co-operation with the threads.

BRIEF DESCRIPTION OF DRAWINGS

The following description of the preferred embodiments may be read with reference to the accompanying drawings wherein:

FIG. 1 represents a prior art pressure transducer of the flexure type;

FIG. 2 represents a pressure transducer having a welded terminal plate formed in accordance with the principles of the present invention;

BEST MODES FOR CARRYING OUT THE INVENTION

Figure 3A:
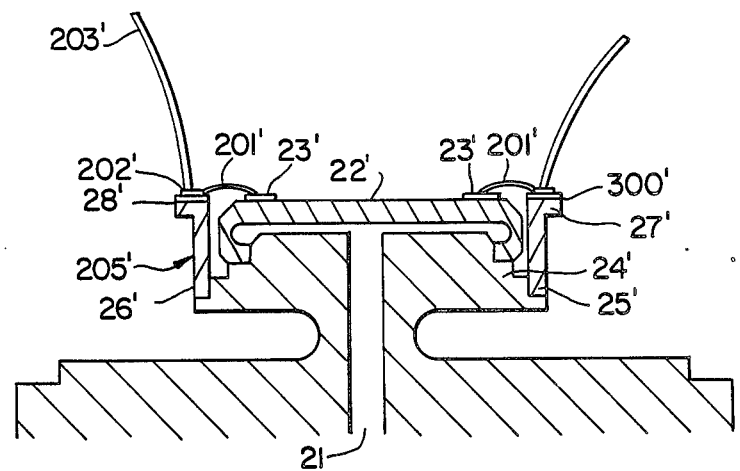
FIGS. 3a and 3b represent an alternative embodiment to that of FIG. 2 of a pressure transducer having a welded terminal plate.

In a prior art flexure-type pressure transducer of the type shown in FIG. 1, fluid, gas or any other pressure media at a pressure to be measured is introduced via a port 10 to a chamber 11 having a mouth-portion 12. The mouth portion 12 is closed by a flexure member 14 secured to a flange surface 15 extending around the mouth. In use, the region surrounding the outer surface 16 of flexure 14 is maintained at a reference pressure.

The flexure member 14 is arranged to be displaced in response to pressure difference between the pressure to be measured, acting upon the inner surface 17, and the reference pressure acting upon the outer surface 16. Displacement of the flexure 14 may be electrically sensed by strain gauges, such as strain gauge 18 affixed to the outer surface 16 of the flexure 14. The strain gauges may for example be arranged in a bridge or otherwise to provide an electrical signal representative of pressure difference. In any event, input/output electrical connections, such as gold wire 19, are required to contact the strain gauges.

The strain gauge connections are made to terminal pads, such as pad 100 carried upon a glass/epoxy insulating board 101 of annular construction and mounted adjacent flexure 14. Connection 19, for example, is led through the center of the annular board 101 to pad 19, whereupon a more rigid nickel wire 102 connected to an electrically common terminal pad 103 leads away and through a casing (not shown) containing the reference pressure.

The construction of such a prior art transducer will now be considered in more detail.

The casing of the chamber 11 and the flange surface 15 are integrally formed in stainless steel. Flexure 14 is also formed in stainless steel and attached to the flange 15 by virtue of a weld 400 around the periphery of the flexure 14. Insulating board 101 cannot be attached by welding, but is bonded instead with epoxy resin 104. The construction procedure is first to bond in place a stainless steel spacing ring 105 and second to bond thereto the insulating board 101.

Great care must be taken in this multi-step manual assembly procedure to avoid excess resin contacting the flexure 14 which might disrupt its intended displacement characteristics. On the other hand, too little resin results in poor bonding, resulting in catastrophic transducer failure due to bond failure.

In a flexure-type pressure transducer in accordance with the present invention (FIG. 2) chamber 20, mouth portion 21, flexure member 22 and strain gauge 23 have equivalent functions to similar parts of the prior art transducer already described. Flexure 22 is welded to a flange portion 24 so that the transducer may operate as already described. Flange portion 24 has a flange extension 25 to which a stainless steel terminal plate 205 is directly welded. Terminal plate 205 has an integrally formed cylinder portion 26 and annular lip portion 27 which co-operate to provide a surface 28 proximate the flexure outer surface 29. Surface 28 has applied thereto a thick film insulation layer 200, for example formed from vitrified glass. Methods for the application of such an insulative layer are well-known, and need not be described in detail here. A thick film layer of conductive material, such as gold or silver or the like, which is masked to provide terminal pads 202 and 204, is applied to the insulative layer so that connections insulated from the metal parts of the transducer may be made. Flexible leads 201, such as formed from a fine gauge of gold wire, each connect a strain gauge 23 to a pad 202. Nickel wire 203 leads away from electrically common pad 204.

The construction of a pressure transducer in accordance with the present invention will now be considered in more detail.

Terminal plate 205 is formed as a separate part in stainless steel. The glass thick film layer 200 formed thereon is fired in a furnace in accordance with known practice, typically at a temperature between 500° C. and 800° C. A thick film gold paste, applied as necessary to form the required terminal pads 202, 204, is then fitted, at a slightly lower temperature on top of the glass layer 200. The terminal plate 205 may then be welded complete to flange surface extension 25.

A number of important advantages will be apparent arising by virtue of this novel construction. The absence of a bonded joint, particularly a bonded joint in the vicinity of the flexure removes problems associated with excess resin. The presence of a welded joint provides a reliable and secure terminal pad proximate the flexure in a single and repeatable welding operation. It will further be noted that high temperature firing operations may be confined to the terminal plate member 205 prior to mounting upon the flange extension member 25. Thus neither the flexure nor its sensitive strain gauges are subject to a high temperature resin curing cycle, as in prior art arrangements.

Figure 3B:
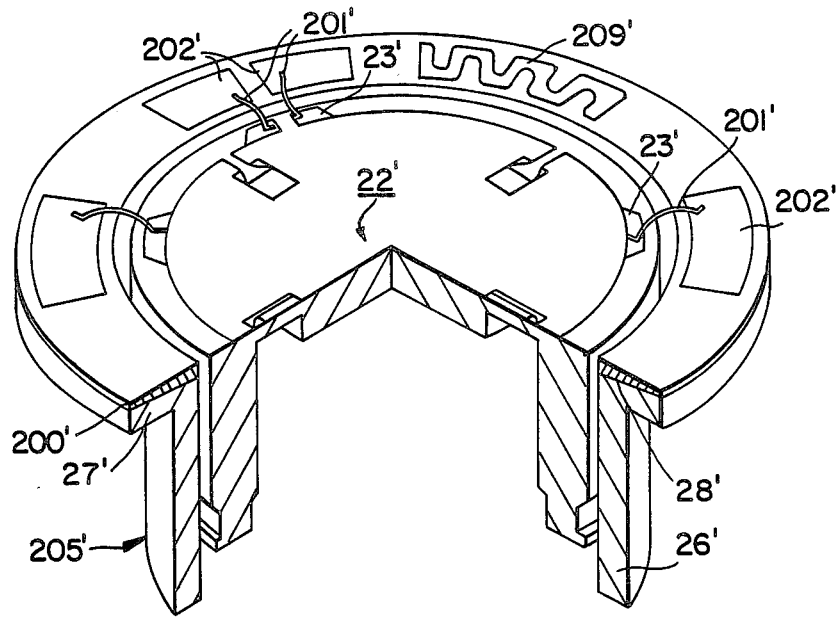

FIGS. 3a and 3b show an alternate and preferred embodiment of the invention. As shown in these figures, flange 24' has a flexure 22' welded to its periphery in similar fashion as described with respect to FIG. 2. A stainless steel terminate plate 205' is welded to a flange portion 25' formed about the periphery of flange 24'. Plate 205' has a cylinder portion 26' and an annular lip portion 27' which cooperate to provide an annular surface 28' approximately level with, but projecting away from, flexure member 22'. A thick film glass layer 200' is formed in surface 28' to which a gold thick film layer, which is screened on layer 200', is applied to form contact pads 202'. The thick film glass and gold layers are formed as described above with respect to FIG. 2. Gold wires 201' connect strain gauges 23' formed on the surface of flexure 22' to contact pads 202'.

The embodiment of FIGS. 3a and 3b provides several distinct advantages. The contact pads on the flexure can be placed at the outer periphery of the flexure, thus reducing mechanical loading on the pressure sensitive area of the flexure. This also helps to provide a higher natural frequency of vibration for the flexure member. Also, as compared to the FIG. 2 embodiment, the length of gold leads 201' is minimized since the connections to strain gauges 23' and contact pads 202' are at the same level and adjacent to each other. This arrangement also simplifies the step of gold-bonding leads 201' to the strain gauge contacts 23' and terminal plate contact pads 202 since all bonding points are at the same level. Also, by directing annular lip 27' outwardly of the flexure 22', lip 27' has an increased surface area compared to lip 27 of FIG. 2. This increased surface area enables further components, such as a resistive compensation network 209' to be applied to lip 27' using a screened-on resistive ink. The arrangement of FIGS. 3a and 3b is also highly resistant to vibration and shock.

Figure 4:
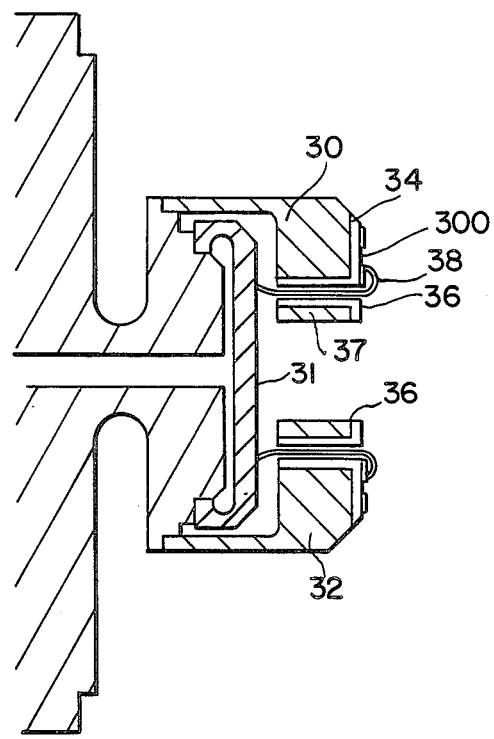
FIG. 4 represents a further alternative embodiment of a pressure transducer having a welded terminal plate.

In yet another embodiment of the present invention shown in FIG. 4, a terminal plate 30 is mounted adjacent flexure 31. Terminal plate 30 has an annular portion 32 of extended thickness, with a plurality of conduits, such as conduit 33 extending therethrough. An insulative layer 34 (e.g. of glass) is formed as on outer surface 35 of annular portion 32 and extends down the side walls of the conduits, for example as a layer 36 on side wall 37. Electrically conductive leads 38 (e.g. made from fine gold wire) connect each strain gauge 39 to a respective terminal pad 300. This alternative provides yet further improved security of construction for transducers subject to shock and vibration.

Figure 5:
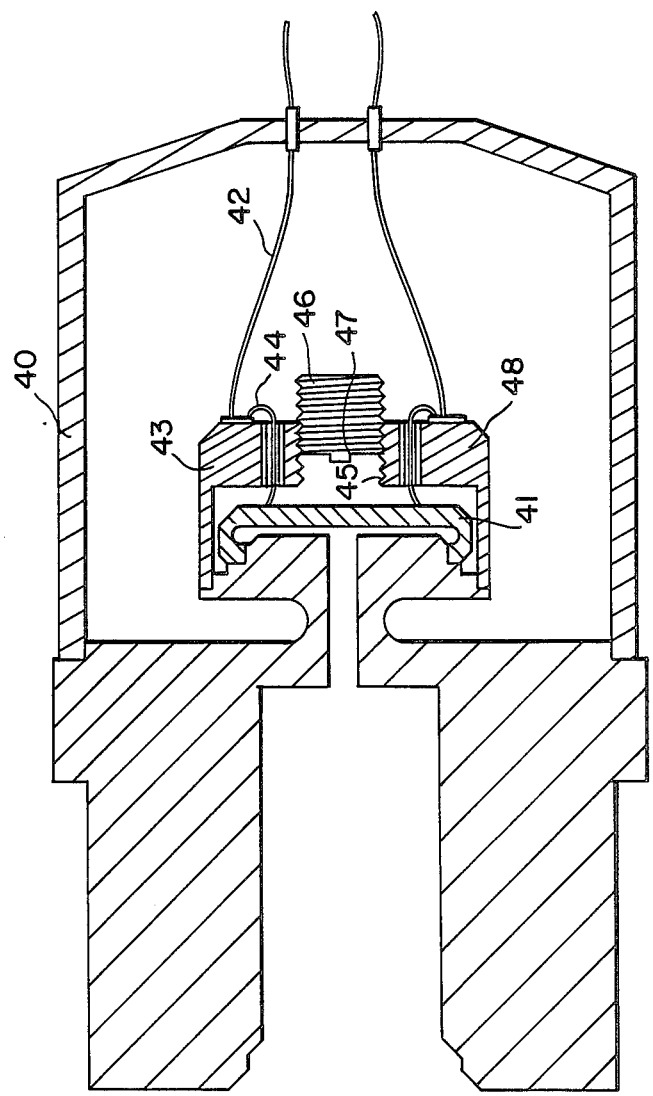
FIG. 5 represents a pressure transducer of the type shown in FIG. 4 having an adjustable stop screw.

FIG. 5 shows a complete flexure type pressure transducer assembly utilizing a terminal assembly of the type shown in FIG. 4. A reference chamber casing 40 surrounds the outside face of flexure 41 and nickel leads such as lead 42 are brought through the casing 40. A terminal plate 48 is provided having an annular portion 43 of extended thickness. Gold leads, such as lead 44, are brought through conduits 300 formed in the annular portion 43 of terminal plate 48 as described above.

Apart from the shock and vibration problems considered above prior art transducers of the flexure type can be damaged if excessive pressure is applied to the measurement part. This can result in strain or deformation of the flexure member and consequent degradation of accuracy. The damage due to excess pressure may be prevented by means of a physical stop set to contact the flexure member at an extreme of its permissible movement. In prior art configurations provision of such a stop was not possible because of absence of a rigid member proximate the flexure member upon which a stop could be mounted.

In the present embodiment, as shown in FIG. 5, the inner surface 45 of annular portion 43 of terminal plate 42 is threaded to receive a set screw 46. Screw 46 includes an extended tip 47 which may be positioned to limit the displacement of the flexure member 41 by advancing the set screw 46 in the threads of annular portion 43. Set screw 46 may be formed in stainless steel and once positioned may be welded in place.

While various embodiments and examples of the present invention have been shown and described, it will be apparent to those skilled in the art that many more modifications are possible without departing from the inventive concepts described herein. The invention, therefore, is not to be restricted, except by the spirit of the appended claims.

What is claimed is:

1. A pressure transducer comprising:
   a chamber-shaped pressure inlet port including a mouth portion and an adjoining flanged portion terminating in a flanged surface;
   a flexure including a first side and a second side, sensitive to a pressure difference between said first side and said second side, sealably attached to said flanged surface such that said first side of said flexure closes said inlet port;
   at least one strain gauge, attached to said second side of said flexure, adapted to electrically sense displacement of said flexure due to a pressure difference between said first side and said second side;
   an annular-shaped terminal plate, of a material weldable to said flanged surface, attached at a first end to said flanged surface and including a second end defining a flanged annulus, proximate said flexure, adapted to receive a thick film insulative layer thereon, said flanged annulus being integrally joined at a radially outward edge to said second end;
   a thick film insulative layer deposited on said flanged annulus, and
   at least one terminal, for making electrical connections from said strain gauge, including an area of electrically conducting thick film formed upon said thick film insulative layer.

2. The pressure transducer of claim 1, wherein said annular-shaped terminal plate is weldably attached at said first end to said flanged surface.

3. A pressure transducer comprising:
   a chamber-shaped pressure inlet port including a mouth portion and an adjoining flanged portion terminating in a flanged surface;
   a flexure including a first side and a second side, sensitive to a pressure difference between said first side and said second side, sealably attached to said flanged surface such that said first side of said flexure closes said inlet port;
   at least one strain gauge, attached to said second side of said flexure, adapted to electrically sense displacement of said flexure due to a pressure difference between said first side and said second side;
   an annular-shaped terminal plate, of a material weldable to said flanged surface, attached at a first end to said flanged surface and including a second end defining a flanged annulus, proximate said flexure, adapted to receive a thick film insulative layer thereon, said flanged annulus being integrally joined at a radially inward edge to said second end;
   a thick film insulative layer deposited on said flanged annulus, and
   at least one terminal, for making electrical connections from said strain gauge, including an area of electrically conducting thick film formed upon said thick film insulative layer.

4. The pressure transducer of claim 3, wherein said annular-shaped terminal plate is weldably attached at said first end to said flanged surface.

5. A pressure transducer comprising:
   a chamber-shaped pressure inlet port including a mouth portion and an adjoining flanged portion terminating in a flanged surface;
   a flexure including a first side and a second side, sensitive to a pressure difference between said first side and said second side, sealably attached to said flanged surface such that said first side of said flexure closes said inlet port;
   at least one strain gauge, attached to said second side of said flexure, adapted to electrically sense displacement of said flexure due to a pressure difference between said first side and said second side;
   a terminal plate, of a material weldable to said flanged surface, attached at a first end to said flanged surface including a second end defining a flanged annulus, proximate said flexure, adapted to receive a thick film insulative layer thereon, said flanged annulus being integrally joined to said second end, said terminal plate further including an extendable stop adapted to limit the displacement of said flexure;
   a thick film insulative layer deposited on said flanged annulus;
   at least one terminal, for making electrical connections from said strain gauge, including an area of electrically conducting thick film formed upon said thick film insulative layer.

6. The pressure transducer of claim 5, wherein said extendable stop includes a threaded screw, and wherein said terminal plate includes threads adapted to mate with said threaded screw, whereby a stop position may be adjusted by rotating said threaded screw in said terminal plate.

7. A pressure transducer comprising:
   a chamber-shaped pressure inlet port including a mouth portion and an adjoining flanged portion terminating in a flanged surface;
   a metal flexure including a first side and a second side, having no openings between said first side and said second side, adapted to deflect up to an adjustable predetermined maximum deflection in response to a pressure difference between said first side and said second side, sealably attached to said flanged surface such that said first side of said flexure closes said inlet port;

at least one strain gauge, attached to said second side of said flexure, adapted to electrically sense deflection of said flexure due to a pressure difference between said first side and said second side;

a terminal plate, of a material weldable to said flanged surface, attached at a first end to said flanged surface and including a second end defining a flanged portion, proximate said flexure, adapted to receive a thick film insulative layer thereon;

a thick film insulative layer deposited on said flanged region, and at least one terminal, for making electrical connections from said strain gauge, including an area of electrically conducting thick film formed upon said thick film insulative layer.

8. The pressure transducer of claim 7, wherein said terminal plate further includes an extendable stop adapted to limit the maximum displacement of said flexure.

9. The pressure transducer of claim 7, wherein said flanged portion of said terminal plate defines an annulus surrounding said flexure.

10. The pressure transducer of claim 7, wherein said flanged portion of said terminal plate is disposed on a plane defined by but displaced from said second side of said flexure.

11. The pressure transducer of claim 7, wherein said flanged portion of said terminal plate is disposed on a plane defined by said second side of said flexure.

12. The pressure transducer of claim 7, further including at least one flexible conductive wire connecting said strain gauge and said terminal.

13. The pressure transducer of claim 7, wherein said flexure comprises a stainless steel diaphragm.

* * * * *